C. H. SAYRE.
Cultivator.
No. 18,073. Patented Aug. 25, 1857.
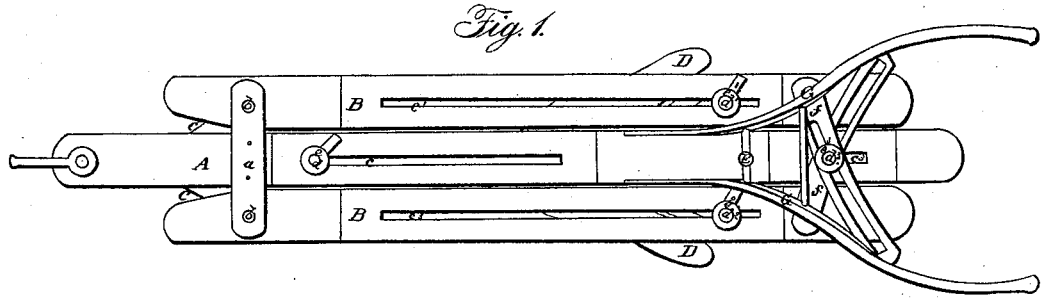
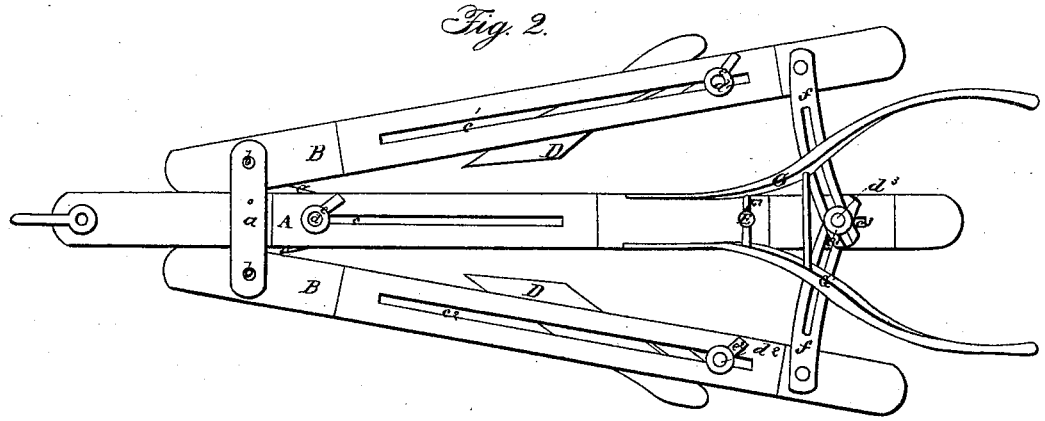
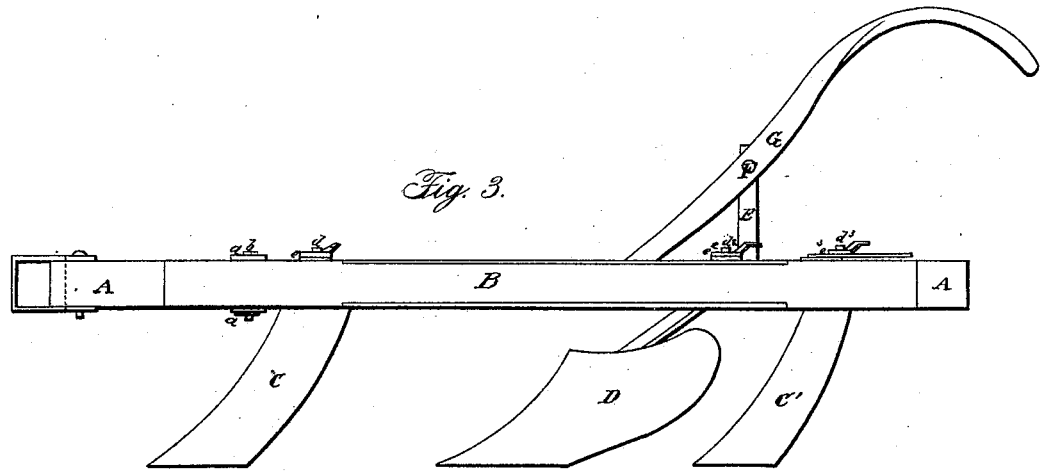

UNITED STATES PATENT OFFICE.

CHAS. H. SAYRE, OF UTICA, NEW YORK, ASSIGNOR TO HIMSELF AND SAMUEL REMINGTON.

IMPROVEMENT IN CULTIVATORS.

Specification forming part of Letters Patent No. 18,073, dated August 25, 1857.

*To all whom it may concern:*

Be it known that I, CHARLES H. SAYRE, of Utica, in the county of Oneida and State of New York, have invented a new and useful Combined Horse-Hoe and Double Mold-Board Plow, of which the following is a full, clear, and exact description, reference being had to the accompanying drawings, making a part of this specification, in which—

Figure 1 represents a plan of my improved implement, the side beams being closed. Fig. 2 represents a similar view of the same, the side beams being opened out. Fig. 3 represents a side elevation of the same. Fig. 4 represents a perspective view of the same when adjusted to be used as a double mold-board plow.

My improvement consists in combining in one machine a horse-hoe and double mold-board plow, so as to render it capable of being adapted to the cultivation of crops planted in rows, and also for hilling up the same when sufficiently cultivated.

To enable others skilled in the art to make, construct, and use my invention, I will now proceed to describe its parts in detail.

The frame consists of three beams, hinged together at their forward ends by means of strap-pieces $a$, secured to the main beam A above and below, to the ends of which the outer beams, B B, are pivoted by pins $b$, their inner sides being beveled off to permit their rear ends to be opened out in the arc of a circle of which the pins form the center. These beams are provided with longitudinal slots $c$ $c'$ $c^2$ $c^3$, for the reception of the shanks of the cultivator-teeth C C' and mold-boards D, the former in the slots of the main beam and the latter in the side beams. These slots may be framed, if desired, with metallic plates above and below to prevent cutting or wearing out of the beams.

The shanks $d$ $d'$ $d^2$ $d^3$ of the cultivator-teeth and mold-boards have a screw-thread cut upon them, by means of which, when passed through the slots, they are secured to the beams by screw-nuts $e$ $e'$ $e^2$ $e^3$, a washer being interposed between the latter and the top of the beam to prevent abrasion. The shanks $d$ $d'$ $d^2$ $d^3$ may be secured to the cultivator-teeth C C' and mold-boards D in any well-known manner. In this instance they are secured to the cap-plate of the teeth and to strips of metal secured to the inner side of the mold-board by rivets or otherwise.

On the rear end of each of the side beams is pivoted a slotted arm, $f$, through which is passed the shank of the rear cultivator-tooth, C', by which means the side beams can be adjusted or set to any required angle to the main beam, and secured in that position by the nut $e^3$, which not only secures the tooth C' to the frame, but binds the inner end of the arms $f$ to the main beam A.

When it is desired to cultivate crops the teeth and mold-boards are arranged substantially as shown in Fig. 2; but when it is desired to hill crops up they are arranged substantially as shown in Fig. 4, this adjustment being effected by loosening the nuts $e$ $e'$ $e^2$ $e^3$ and then sliding them along the slots until they are arranged in the proper position for this purpose, when they are again secured to the beams by tightening the nuts, the necessary pitch of the mold-boards to suit the width of the rows being given by properly adjusting the slotted arms $f$.

The handle may be secured to the machine in any well-known manner. In this instance a standard, E, is shown, having a cross-beam, F, extending from it on either side, connecting it with the handle G of the plow for its support.

By setting the side beams and sliding the teeth and mold-boards up or down the slots the machine can be adjusted to cultivate crops of different widths of rows.

Having thus described my invention, what I claim as new, and desire to secure by Letters Patent, is—

A combined horse-hoe and double mold-board plow, constructed, arranged, and operated substantially as set forth.

In testimony whereof I hereunto set my hand.

CHAS. H. SAYRE.

Witnesses:
I. N. RICE,
B. F. SHERWOOD.